United States Patent
Fujii et al.

(10) Patent No.: US 10,618,368 B2
(45) Date of Patent: Apr. 14, 2020

(54) VEHICLE ATTITUDE CONTROL DEVICE

(71) Applicant: TOYOTA JIDOSHA KABUSHIKI KAISHA, Toyota-shi, Aichi-ken (JP)

(72) Inventors: Daigo Fujii, Susono (JP); Shingo Koumura, Okazaki (JP); Hirokazu Yabumoto, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 186 days.

(21) Appl. No.: 15/960,953

(22) Filed: Apr. 24, 2018

(65) Prior Publication Data
US 2019/0039429 A1    Feb. 7, 2019

(30) Foreign Application Priority Data

May 11, 2017 (JP) .................................. 2017-094773

(51) Int. Cl.
  *B60T 8/17* (2006.01)
  *B60T 8/1755* (2006.01)
  (Continued)

(52) U.S. Cl.
  CPC ......... *B60G 17/018* (2013.01); *B60G 17/016* (2013.01); *B60G 17/0152* (2013.01); *B60G 17/01908* (2013.01); *B60G 17/01933* (2013.01); *B60G 21/0555* (2013.01); *B60W 30/02* (2013.01); *B60W 40/10* (2013.01); *B60W 40/105* (2013.01); *G05D 1/0891* (2013.01); *B60G 21/055* (2013.01);
  (Continued)

(58) Field of Classification Search
  CPC ............. B60G 17/016; B60G 17/018; B60G 17/01908; B60G 17/01933; G05D 1/0891
  See application file for complete search history.

(56) References Cited

U.S. PATENT DOCUMENTS

| | | | | |
|---|---|---|---|---|
| 2003/0055549 A1* | 3/2003 | Barta | .................. | B60G 17/0182 701/70 |
| 2004/0260447 A1* | 12/2004 | Hamada | ................ | B60T 8/1766 701/70 |
| 2015/0046033 A1* | 2/2015 | Yoshimi | ............... | B60G 17/015 701/37 |

FOREIGN PATENT DOCUMENTS

JP        H07-300008 A    11/1995

OTHER PUBLICATIONS

Daigo Fujii et al. "Ride Comfort Enhancement Using Active Stabilizer"; SAE Technical Paper 2018-01-0563, 2018, doi:10.4271/2018-01-0563; Apr. 3, 2018.

\* cited by examiner

*Primary Examiner* — Adam D Tissot
(74) *Attorney, Agent, or Firm* — Oliff PLC

(57) ABSTRACT

A vehicle attitude control device includes a controller including a low-pass filter. The controller calculates a manipulated variable of the actuator that allows the roll of the vehicle to be suppressed. The controller processes the roll angle acceleration with the low-pass filter, integrates the roll angle acceleration in which a high-frequency component has been removed by the low-pass filter, and converts a roll angle velocity obtained by the integration, into the manipulated variable. The low-pass filter has a first vehicle speed-cutoff frequency characteristic in which a cutoff frequency becomes higher with increase in the vehicle speed, and the first vehicle speed-cutoff frequency characteristic is designed such that a peak frequency in roll vibration coincides with a local minimum roll frequency in wheelbase filtering, the roll vibration being amplified by a dead time and a phase delay in control by the controller.

6 Claims, 12 Drawing Sheets

(51) Int. Cl.
*B62D 6/00* (2006.01)
*B60G 17/018* (2006.01)
*B60W 40/105* (2012.01)
*B60G 21/055* (2006.01)
*B60W 30/02* (2012.01)
*B60W 40/10* (2012.01)
*B60G 17/015* (2006.01)
*B60G 17/016* (2006.01)
*B60G 17/019* (2006.01)
*G05D 1/08* (2006.01)

(52) U.S. Cl.
CPC .......... *B60G 2202/135* (2013.01); *B60G 2400/0511* (2013.01); *B60G 2400/0531* (2013.01); *B60G 2400/204* (2013.01); *B60G 2400/91* (2013.01); *B60G 2600/02* (2013.01); *B60G 2600/16* (2013.01); *B60G 2600/182* (2013.01); *B60G 2600/604* (2013.01); *B60G 2800/012* (2013.01); *B60Y 2300/02* (2013.01); *B60Y 2400/30* (2013.01); *B60Y 2400/303* (2013.01); *B60Y 2400/48* (2013.01); *B60Y 2400/86* (2013.01)

VEHICLE ATTITUDE CONTROL DEVICE

INCORPORATION BY REFERENCE

The disclosure of Japanese Patent Application No. 2017-094773 filed on May 11, 2017 including the specification, drawings and abstract is incorporated herein by reference in its entirety.

BACKGROUND

1. Technical Field

The disclosure relates to a vehicle attitude control device, specifically, relates to a vehicle attitude control device that suppresses roll vibration by making an actuator actively act on roll of a vehicle.

2. Description of Related Art

As a related art, there is known a vehicle attitude control using an actuator that is able to actively act on roll of a vehicle, for example, using an active stabilizer or an active suspension. For example, in a vehicle attitude control disclosed in Japanese Patent Application Publication No. 7-300008, first, a control pressure of a fluid pressure actuator of an active suspension is computed from a displacement feedback controlled variable reflecting an attitude change such as a roll and a feedback controlled variable reflecting a vertical acceleration. Then, a filtering is performed such that a frequency at a trough of the vertical acceleration of a vehicle body that changes depending on vehicle speed is used as a cutoff frequency, and thereby, a new control pressure in which a high-frequency component exceeding the frequency at the trough has been cut is obtained. The cutoff frequency is adapted to the vibration state of a spring that changes depending on the vehicle speed, and is changed continuously depending on the vehicle speed.

SUMMARY

However, no matter how the cutoff frequency is adapted, on the actual road, in many vehicle speed ranges, there is a gap between the cutoff frequency of the filter and the frequency at the trough of the vertical acceleration of the vehicle body. That is, in the vehicle attitude control disclosed in the above patent literature, there is a concern that the roll vibration of the vehicle cannot be sufficiently suppressed in many vehicle speed ranges.

The disclosure provides a vehicle attitude control device that can suppress the roll vibration of the vehicle regardless of vehicle speed range.

A vehicle attitude control device according to an aspect of the disclosure includes: an actuator configured to actively act on roll of a vehicle; a roll angle acceleration sensor configured to measure a roll angle acceleration of the vehicle; a speed sensor configured to measure a vehicle speed of the vehicle; and a controller including a low-pass filter, the controller being configured to calculate a manipulated variable of the actuator based on the roll angle acceleration and the vehicle speed, the manipulated variable being a manipulated variable that allows the roll of the vehicle to be suppressed. The controller is configured to process the roll angle acceleration with the low-pass filter, to integrate the roll angle acceleration in which a high-frequency component has been removed by the low-pass filter, and to convert a roll angle velocity obtained by the integration, into the manipulated variable. The low-pass filter has a first vehicle speed-cutoff frequency characteristic in which a cutoff frequency becomes higher with increase in the vehicle speed, and the first vehicle speed-cutoff frequency characteristic is designed such that a peak frequency in roll vibration coincides with a local minimum roll frequency in wheelbase filtering, the roll vibration being amplified by a dead time and a phase delay in control by the controller.

In the configuration, the cutoff frequency of the low-pass filter is adjusted depending on the vehicle speed, such that the peak frequency in the roll vibration that is amplified by the dead time and the phase delay in the control by the controller coincides with the local minimum roll frequency in the wheelbase filtering, and therefore, the roll vibration of the vehicle is suppressed regardless of the vehicle speed.

In the above aspect, the first vehicle speed-cutoff frequency characteristic may be designed such that the peak frequency coincides with a primary local minimum roll frequency in the wheelbase filtering.

By such a design, a wide speed range can be covered with a single vehicle speed-cutoff frequency characteristic.

In the above aspect, the low-pass filter may have a second vehicle speed-cutoff frequency characteristic, the second vehicle speed-cutoff frequency characteristic being designed such that the second vehicle speed-cutoff frequency characteristic is higher than the first vehicle speed-cutoff frequency characteristic in a cutoff frequency with respect to an identical vehicle speed and the peak frequency coincides with a secondary local minimum roll frequency in the wheelbase filtering, and the controller may be configured to switch a characteristic of the low-pass filter from the first vehicle speed-cutoff frequency characteristic to the second vehicle speed-cutoff frequency characteristic, when the vehicle speed becomes lower than a first threshold speed.

By performing the switching, it is possible to suppress the roll vibration of the vehicle in a wider vehicle speed range containing a low vehicle speed range.

In the above aspect, the controller may be configured to switch the characteristic of the low-pass filter from the second vehicle speed-cutoff frequency characteristic to the first vehicle speed-cutoff frequency characteristic, when the vehicle speed becomes higher than a second threshold speed that is higher than the first threshold speed.

By providing a hysteresis with a gap between the first threshold speed and the second threshold speed in this way, it is possible to prevent chattering from occurring in the switching of the vehicle speed-cutoff frequency characteristic.

In the above aspect, the controller may be configured to calculate a correction value, by multiplying the roll angle acceleration in which the high-frequency component has been removed by the low-pass filter, by a phase delay compensation time constant, and to add the correction value to the roll angle velocity to be converted into the manipulated variable, and a value of the phase delay compensation time constant may be changed depending on the vehicle speed.

By adding, as a parameter, the phase delay compensation time constant that is set depending on the vehicle speed, it is possible to increase the coincidence degree between the local minimum roll frequency and the peak frequency in the roll vibration, and to further suppress the roll vibration of the vehicle.

In the above aspect, the controller may be configured to set the phase delay compensation time constant to zero, when the vehicle speed is equal to or lower than a third threshold speed, and to increase the phase delay compensation time constant with the increase in the vehicle speed, when the vehicle speed is higher than the third threshold speed.

By setting the phase delay compensation time constant depending on the vehicle speed in this way, it is possible to suppress the roll vibration of the vehicle in a wider vehicle speed range containing a high vehicle speed range.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
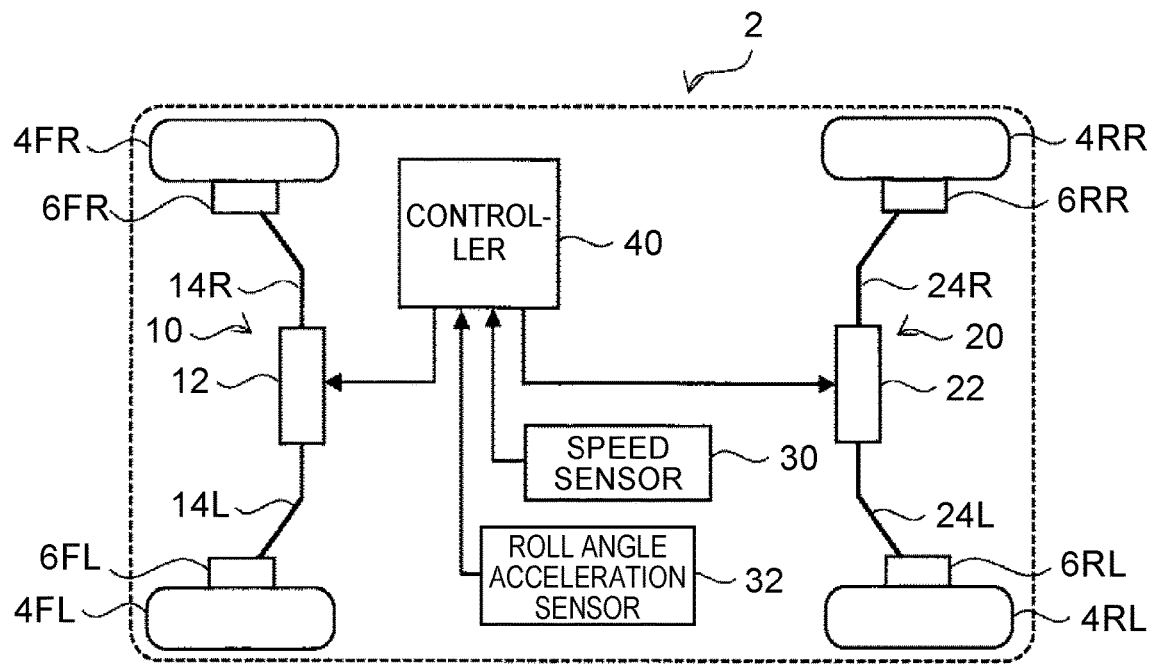
FIG. 1 is a diagram schematically showing a system configuration of a vehicle attitude control device in an embodiment.

Hereinafter, an embodiment of the disclosure will be described with reference to the drawings. In the drawings, identical reference characters are assigned to common elements, and repetitive descriptions are omitted. In the embodiment shown below, when numerical values such as the number of elements, quantity, amount and range are mentioned, the disclosure is not limited to the mentioned numerical values, except when an explicit description is particularly made or when the disclosure is obviously specified to the mentioned numerical value. Further, structures and the like described in the embodiment shown below are not necessarily essential, except when an explicit description is particularly made or when the disclosure is obviously specified to the mentioned structures.

Configuration of Vehicle Attitude Control Device

Hereinafter, an embodiment of the disclosure will be described with reference to the drawings. FIG. 1 is a diagram schematically showing a system configuration of a vehicle attitude control device in the embodiment. The vehicle attitude control device is equipped in a vehicle 2 including four wheels 4FR, 4FL, 4RR, 4RL. Driving wheel of the vehicle 2 may be front wheels 4FR, 4FL, may be rear wheels 4RR, 4RL, or may be all wheels 4FR, 4FL, 4RR, 4RL. A power unit of the vehicle 2 may be an internal combustion engine, may be an electric motor, or may be a hybrid system including both of the internal combustion engine and the electric motor.

The vehicle attitude control device includes a front wheel active stabilizer 10, a rear wheel active stabilizer 20, and a controller 40 that controls the front wheel active stabilizer 10 and the rear wheel active stabilizer 20. The vehicle attitude control device further includes various sensors 30, 32 for acquiring a variety of information that is used for the control of the active stabilizers 10, 20. For example, the various sensors include at least a speed sensor 30 for measuring the vehicle speed of the vehicle 2 and a roll angle acceleration sensor 32 for measuring the roll angle acceleration of the vehicle 2.

The front wheel active stabilizer 10 includes stabilizer bars 14R, 14L linked with suspension mechanisms 6FR, 6FL of the right and left front wheels 4FR, 4FL, and a stabilizer actuator 12 attached on an axis of the stabilizer bars 14R, 14L. The stabilizer actuator 12 is constituted of an electric motor and a speed reducer, which are not illustrated. The stabilizer bars 14R, 14L are in a two-divided state, and the torsion angle between the right and left stabilizer bars 14R, 14L is controlled by the stabilizer actuator 12. By the control of the torsion angle by the stabilizer actuator 12, the torsion torque to act on the right and left suspension mechanisms 6FR, 6FL changes. Thereby, the anti-roll moment to be given to the vehicle 2 at the positions of the front wheels 4FR, 4FL increases or decreases, so that the roll stiffness of the vehicle on the front wheel side changes.

Similarly, the rear wheel active stabilizer 20 includes stabilizer bars 24R, 24L linked with suspension mechanisms 6RR, 6RL of the right and left rear wheels 4RR, 4RL, and a stabilizer actuator 22 attached on an axis of the stabilizer bars 24R, 24L. The stabilizer actuator 22 is constituted of an electric motor and a speed reducer, which are not illustrated. The stabilizer bars 24R, 24L are in a two-divided state, and the torsion angle between the right and left stabilizer bars 24R, 24L is controlled by the stabilizer actuator 22. By the control of the torsion angle by the stabilizer actuator 22, the torsion torque to act on the right and left suspension mechanisms 6RR, 6RL changes. Thereby, the anti-roll moment to be given to the vehicle 2 at the positions of the rear wheels 4RR, 4RL increases or decreases, so that the roll stiffness of the vehicle on the rear wheel side changes.

The controller 40 controls the torsion angle as the manipulated variable of the active stabilizers 10, 20, by drive currents that are supplied to the stabilizer actuators 12, 22. The controller 40 is configured to compute the torsion angle for suppressing the roll that occurs in the vehicle 2, mainly based on a signal from the roll angle acceleration sensor 32, and to determine the drive current that should be supplied to the stabilizer actuators 12, 22, depending on the target torsion angle.

In the embodiment, the control of the active stabilizers 10, 20 by the controller 40 is referred to as a vehicle attitude control. The controller 40 is an ECU including at least one memory and at least one processor. In the memory, a variety of data including a variety of programs and maps to be used for the vehicle attitude control is stored. The processor reads the programs from the memory and executes the programs. Thereby, functions for the vehicle attitude control are realized in the controller 40.

Outline of Vehicle Attitude Control

Figure 2:
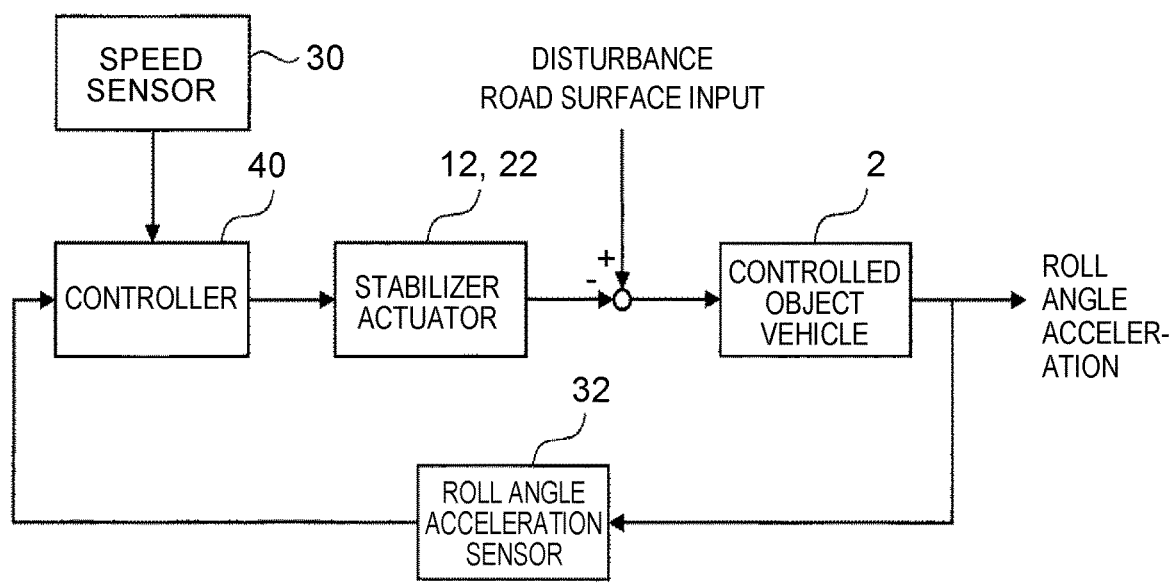
FIG. 2 is a loop diagram of a feedback control signal in a vehicle attitude control by the vehicle attitude control device shown in FIG. 1.

The vehicle attitude control is a roll skyhook control of feeding back the roll of the vehicle and controlling the active stabilizers 10, 20 based on the skyhook theory. FIG. 2 is a loop diagram of a feedback control signal in the vehicle attitude control. In the vehicle attitude control, a signal from the speed sensor 30 is input to the controller 40 together with the signal from the roll angle acceleration sensor 32. The controller 40 determines the manipulated variable of the stabilizer actuators 12, 22, based on the input signals, and outputs a manipulated variable signal to the stabilizer actuators 12, 22. The stabilizer actuators 12, 22 operate in response to the manipulated variable signal, and generate torsion torques in the stabilizer bars 14R, 14L, 24R, 24L.

The torsion torques are input to the vehicle 2 as a controlled object by the stabilizer actuators 12, 22, together with a road surface input that is a disturbance. A roll moment generated by the road surface input and anti-roll moments given by the stabilizer actuators 12, 22 act on the vehicle 2, so that the vehicle 2 perform roll motion. The roll angle acceleration is one of the physical quantities expressing the roll motion of the vehicle 2. The roll angle acceleration of the vehicle 2 is measured by the roll angle acceleration sensor 32, and is input to the controller 40. The roll angle acceleration to be input to the controller 40 is the roll angle acceleration at the position of the center of gravity of the vehicle.

Figure 3:
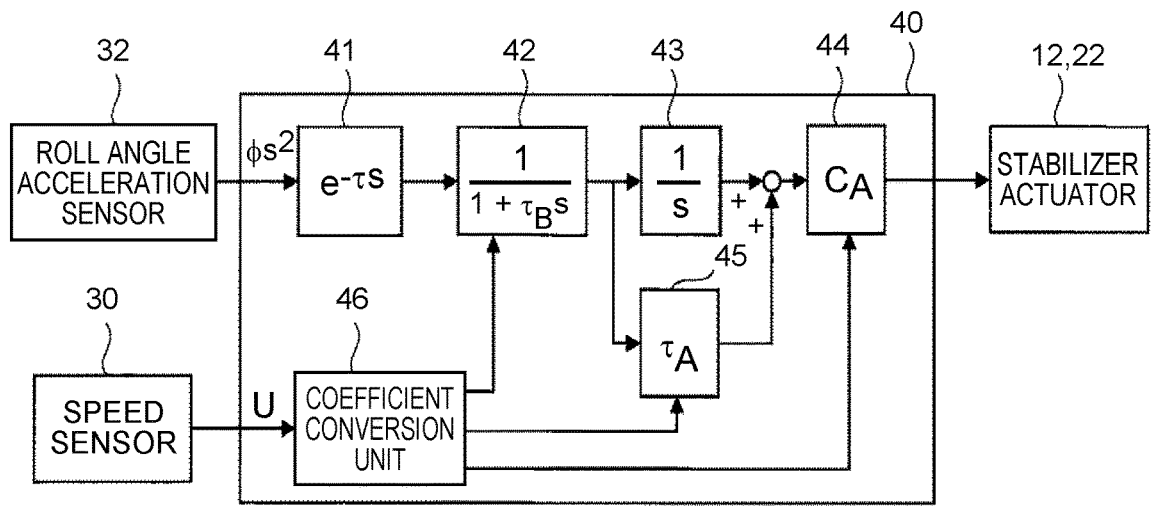
FIG. 3 is a block diagram showing a computation structure of a controller shown in FIG. 1.

For example, a computation structure of the controller 40 is illustrated as a block diagram shown in FIG. 3. As illustrated as blocks in FIG. 3, the controller 40 includes a dead time element 41, a low-pass filter 42, an integrator 43, a roll skyhook damping gain 44, a delay compensator 45, and a coefficient conversion unit 46. In FIG. 3, in the blocks of the dead time element 41, the low-pass filter 42, the integrator 43, the roll skyhook damping gain 44 and the delay compensator 45, the respective transfer functions are described.

When the roll angle velocity of the vehicle 2 is represented as "$\phi$", the roll angle acceleration to be measured by the roll angle acceleration sensor 32 is represented as "$\phi s^2$". The roll angle acceleration $\phi s^2$ input from the roll angle acceleration sensor 32 to the controller 40 is given to the dead time element 41. The dead time element 41 is an equivalent expression of a total $\tau$ of dead times due to signal sending and computation in the interior of the controller 40. The transfer function of the dead time element 41 is represented as "$e^{-\tau s}$".

Next, the roll angle acceleration processed by the dead time element 41 is processed by the low-pass filter 42. The low-pass filter 42 is implemented for removing a high-frequency component of the signal and stabilizing the control. In the present specification, a low-pass filter time constant is represented as "$\tau_B$", and a cutoff frequency is represented as "$f_B$". The low-pass filter time constant $\tau_B$ and the cutoff frequency $f_B$ satisfy a relation of $f_B=1/(2\pi\tau_B)$. The transfer function of the low-pass filter 42 is represented as "$1/(1+\tau_B s)$".

Next, the roll angle acceleration processed by the low-pass filter 42 is processed by the integrator 43. The transfer function of the integrator 43 is represented as "$1/s$". The roll angle velocity is obtained by integrating the roll angle acceleration.

In parallel with the processing by the integrator 43, the roll angle acceleration processed by the low-pass filter 42 is processed also by the delay compensator 45. The delay compensator 45 is an acceleration member that is implemented for compensation of phase delay. When a phase delay compensation time constant is represented as "$\tau_A$", the transfer function of the delay compensator 45 is represented as "$\tau_A$". The roll angle acceleration passes through the delay compensator 45, so that a correction value for the roll angle velocity is obtained.

The correction value obtained by the delay compensator 45 is added to the roll angle acceleration obtained by the integrator 43. The resulting value is processed by the roll skyhook damping gain 44, so that the manipulated variable of the stabilizer actuators 12, 22 is obtained. When a roll skyhook damping coefficient is represented as "$C_A$", the transfer function of the roll skyhook damping gain is represented as "$C_A$".

In the above computation structure of the controller 40, each of the low-pass filter time constant $\tau_B$ (or the cutoff frequency $f_B$), the phase delay compensation time constant $\tau_A$ and the roll skyhook damping coefficient $C_A$ is designed such that the value is changed depending on the vehicle speed. The values of the parameters are changed by the coefficient conversion unit 46. The coefficient conversion unit 46 converts the vehicle speed input from the speed sensor 30 to the controller 40, into values of the parameters, with reference to a previously prepared map.

As can be seen from the computation structure shown in FIG. 3, in the controller 40, dead times due to signal sending and computation are generated, and a phase delay due to the low-pass filter 42 is generated. The dead times and the phase delay cause an amplification of the amplitude of the roll vibration of the vehicle 2 in the vehicle attitude control. Parameters that are included in the computation structure and that can be designed, particularly, the low-pass filter time constant $\tau_B$ or the cutoff frequency $f_B$ paired with the low-pass filter time constant $\tau_B$, and the phase delay compensation time constant $\tau_A$ are parameters that have great influences on the roll vibration. Depending on the design of the parameters, the roll vibration of the vehicle 2 can be suppressed, or instead, the roll vibration can be amplified. Herein, from the low-pass filter time constant $\tau_B$ and the cutoff frequency $f_B$, the cutoff frequency $f_B$ is employed as a designed object. Hereinafter, the design of the cutoff frequency $f_B$ and the design of the phase delay compensation time constant $\tau_A$, which are employed in the embodiment, will be described.

Influence of Vehicle Attitude Control on Roll Vibration

Figure 4:
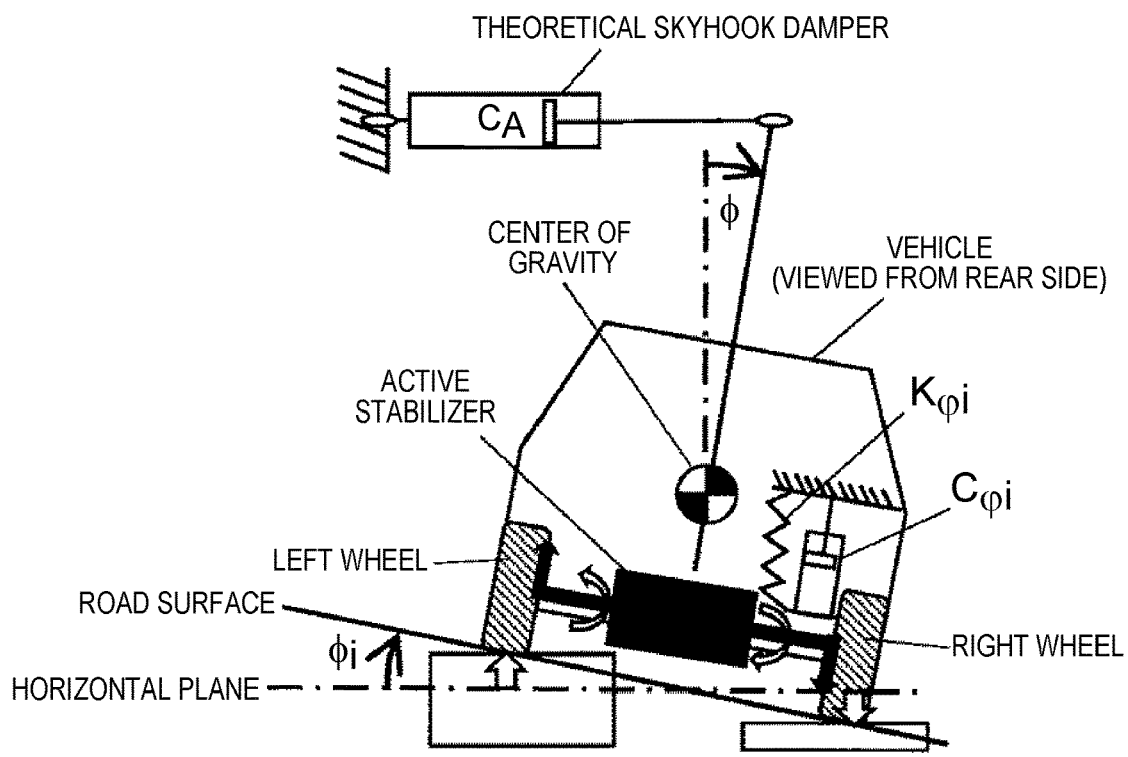
FIG. 4 is a diagram showing a single-degree-of-freedom model of a roll skyhook control.

FIG. 4 is a diagram showing a single-degree-of-freedom model of the roll skyhook control. First, using the single-degree-of-freedom model, an influence of the vehicle attitude control on the roll vibration will be analyzed.

In the single-degree-of-freedom model shown in FIG. 4, when an active stabilizer is controlled by a controller having the control structure shown in FIG. 3, the motion equation is expressed as Equation (1).

[Equation 1]

$$I_x \phi s^2 = \sum (K_{\phi i} + C_{\phi i} s)(\phi_i - \phi) - \frac{1 + \tau_A s}{1 + \tau_B s} C_A \phi s e^{-\tau s} \quad (1)$$

The meanings of symbols in FIG. 4 and Equation (1) are shown as follows: $I_x$ represents roll inertia moment, $\phi$ represents roll angle of the vehicle, $\phi_i$ represents road surface input roll angle into which vertical road surface displacement at each axle position is converted, $K_{\phi i}$ represents roll stiffness at each axle position, $C_{\phi i}$ represents absorber roll damping coefficient at each axle position, $C_A$ represents roll skyhook damping coefficient, and s represents Laplace variable. Here, as for the subscript i, 1 indicates a front axle, and 2 indicates a rear axle.

Figure 5:
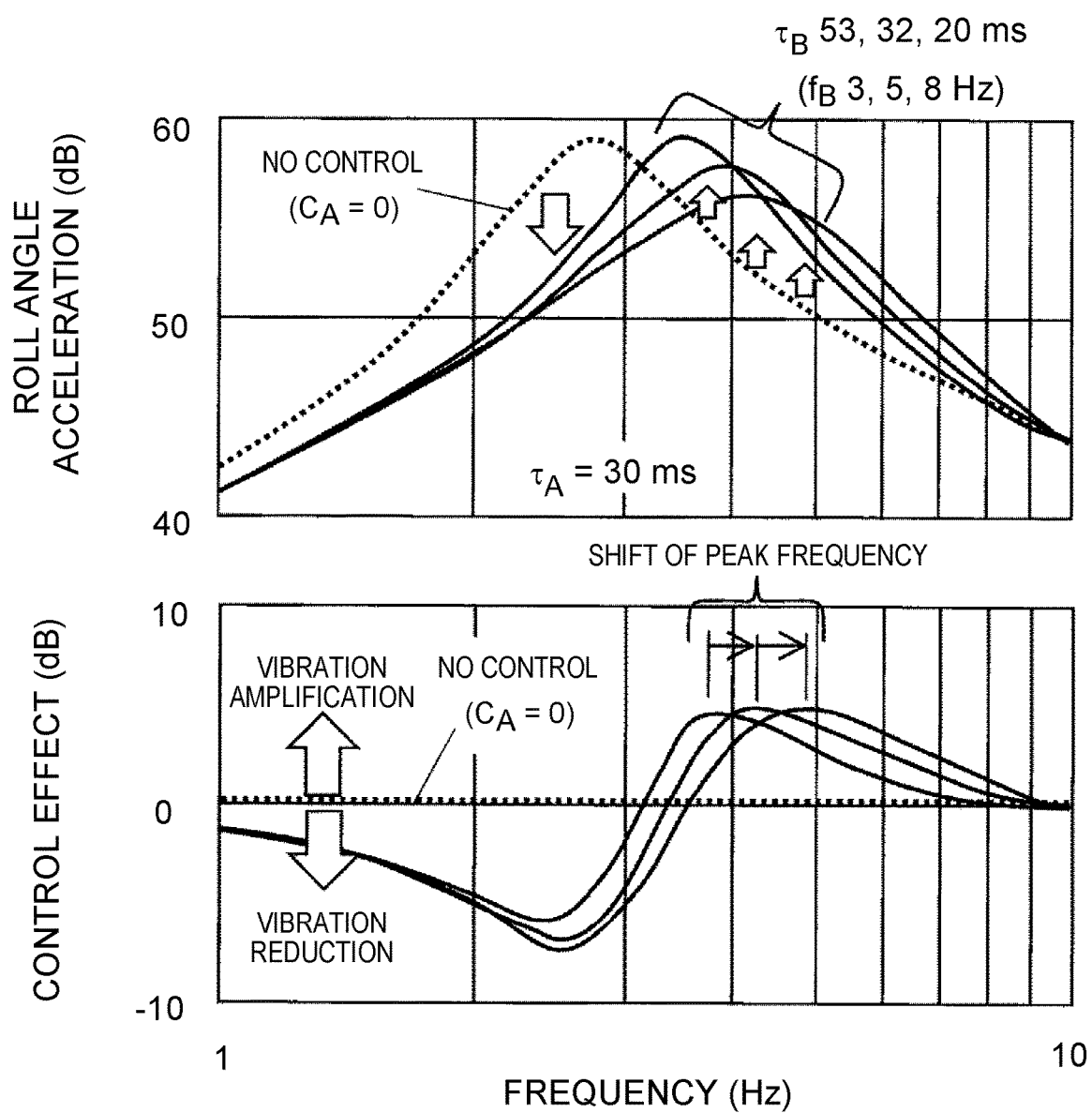
FIG. 5 is a diagram showing the relation between a cutoff frequency and a peak frequency in roll vibration that is obtained by the calculation using the single-degree-of-freedom model shown in FIG. 4.

FIG. 5 is a diagram showing the relation between the cutoff frequency $f_B$ (low-pass filter time constant $\tau_B$) and the peak frequency in the roll vibration that is obtained by the calculation using the single-degree-of-freedom model shown in FIG. 4. Specifically, the upper graph in FIG. 5 illustrates the relation between the frequency and the roll angle acceleration in the roll vibration that is obtained by the calculation of Equation (1). The ordinate axis of the graph indicates the power spectral density of the roll angle acceleration, and 60 dB is 1 rad²/s⁴ Hz. In the calculation, the road surface input roll angle $\phi_i$ is set to $\phi_1 = \phi_2 = 8$ f² mrad²/Hz, where f represents the frequency, and the phase delay compensation time constant $\tau_A$ is set to 30 ms. The graph illustrates relations when the low-pass filter time constant $\tau_B$ is 53 ms, 32 ms and 20 ms (that is, when the cutoff frequency $f_B$ is 3 Hz, 5 Hz and 8 Hz), together with a relation when the vehicle attitude control is not performed (when the roll skyhook damping coefficient $C_A$ is zero).

The lower graph in FIG. 5 illustrates the relation between the frequency and control effect. In the present specification, the control effect means a roll amplification rate when the vehicle attitude control is performed compared to when the vehicle attitude control is not performed (when $C_A$ is zero). This graph reveals that there are a frequency range in which the roll vibration can be suppressed by the vehicle attitude control and a frequency range in which the roll vibration is amplified by the vehicle attitude control. Further, this graph reveals that the peak frequency when the roll vibration is amplified varies depending on the change in the low-pass filter time constant $\tau_B$ (that is, the change in the cutoff frequency $f_B$).

Figure 6A:
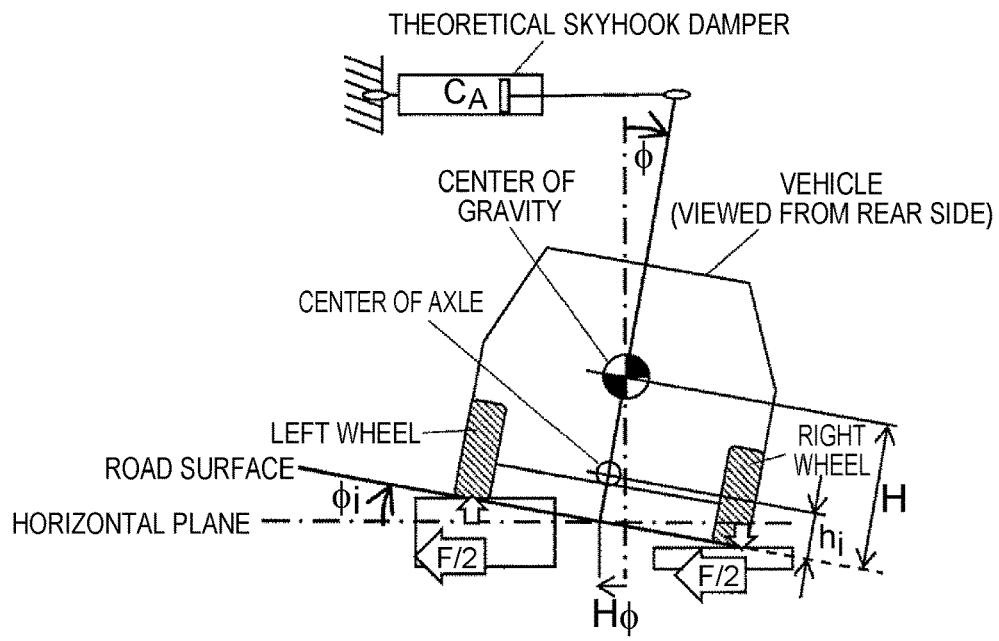
FIG. 6A is a diagram showing a three-degree-of-freedom model of the roll skyhook control and showing a model that expresses the roll motion and vertical motion of a vehicle.
Figure 6B:
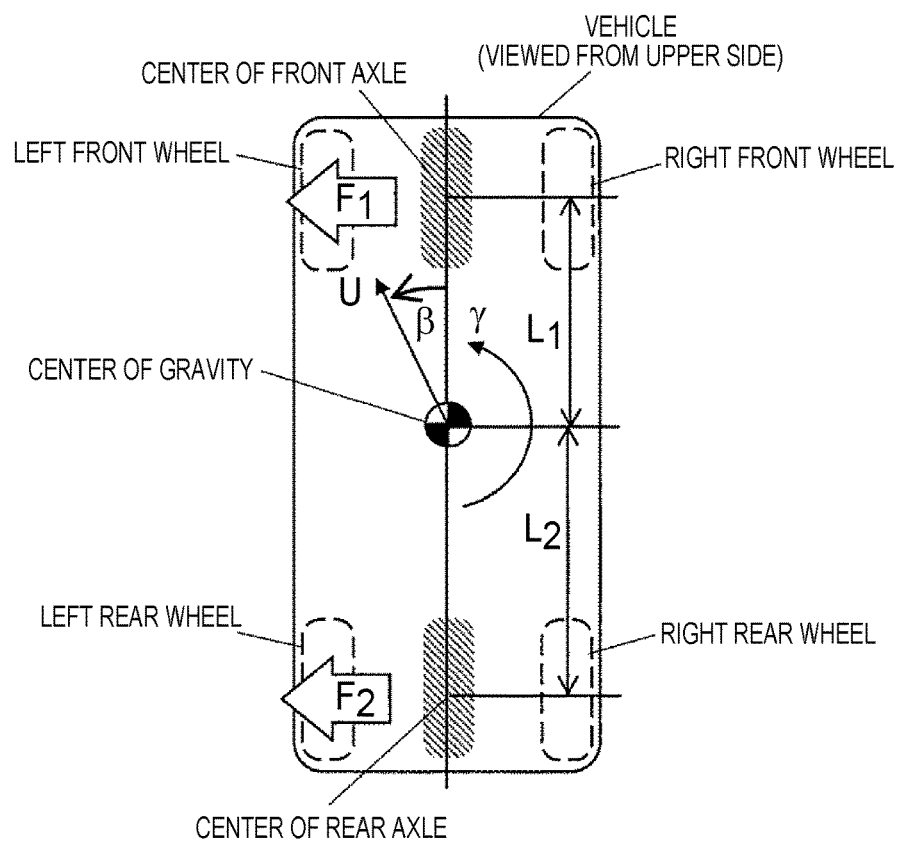
FIG. 6B is a diagram showing the three-degree-of-freedom model of the roll skyhook control and showing a model that expresses the yaw motion of the vehicle.

Next, using a more detailed three-degree-of-freedom model, an influence of the vehicle attitude control on the roll vibration will be analyzed. When a vehicle traveling on an actual road is rolled by a road surface input, the horizontal motion and yaw motion of the vehicle concurrently occur due to tire lateral force generated at grounding points. The three-degree-of-freedom model is a model in which the concurrent occurrence of the roll motion, the horizontal motion and the yaw motion is considered, and for example, is shown in FIG. 6A and FIG. 6B. FIG. 6A is a model showing the roll motion and horizontal motion of the vehicle, and FIG. 6B is a model showing the yaw motion of the vehicle. In FIG. 6A, some of the elements already illustrated in FIG. 4 are not illustrated, for the sake of illustration space.

In the three-degree-of-freedom model shown in FIG. 6A and FIG. 6B, when an active stabilizer is controlled by a controller having the control structure shown in FIG. 3, the motion equation is expressed as Equation (2), Equation (3) and Equation (4).

[Equation 2]

$$\left[I_x s^2 + \sum (K_{\phi i} + C_{\phi i} s) + \frac{1 + \tau_A s}{1 + \tau_B s} C_A s e^{-\tau s} - mg(H - h)\right]\varphi = \sum (K_{\phi i} + C_{\phi i} s)\varphi_i + \sum F_i (H - h_i) \quad (2)$$

[Equation 3]

$$mU(\beta s + \gamma) = F_1 + F_2 \quad (3)$$

[Equation 4]

$$I_z \gamma s = F_1 L_1 - F_2 L_2 \quad (4)$$

Here, in Equation (3) and Equation (4), $F_i$ is expressed as the following Equation (5).

[Equation 5]

$$F_i = K_i^* \left(-\beta \mp \frac{\gamma L_i}{U} - \frac{H \phi s}{U}\right) \quad (5)$$

The meanings of symbols in FIG. 6A, FIG. 6B and the equations are shown as follows: m represents vehicle weight, g represents gravity acceleration, H represents the height of the center of gravity of the vehicle, h represents the height of the roll center at the position of the center of gravity of the vehicle, $h_i$ represents the height of the roll center at each axle position, U represents vehicle speed, $\beta$ represents the sideslip angle of the center of gravity of the vehicle, Y represents vehicle yaw angle velocity, $I_z$ represents yaw inertia moment, $L_i$ represents the distance from each axle to the center of gravity, L represents wheelbase (L=$L_1$+$L_2$), $F_i$ represents grounding point lateral force at each axle position, and $K_i^*$ represents complex equivalent cornering power at each axle position.

Figure 7:
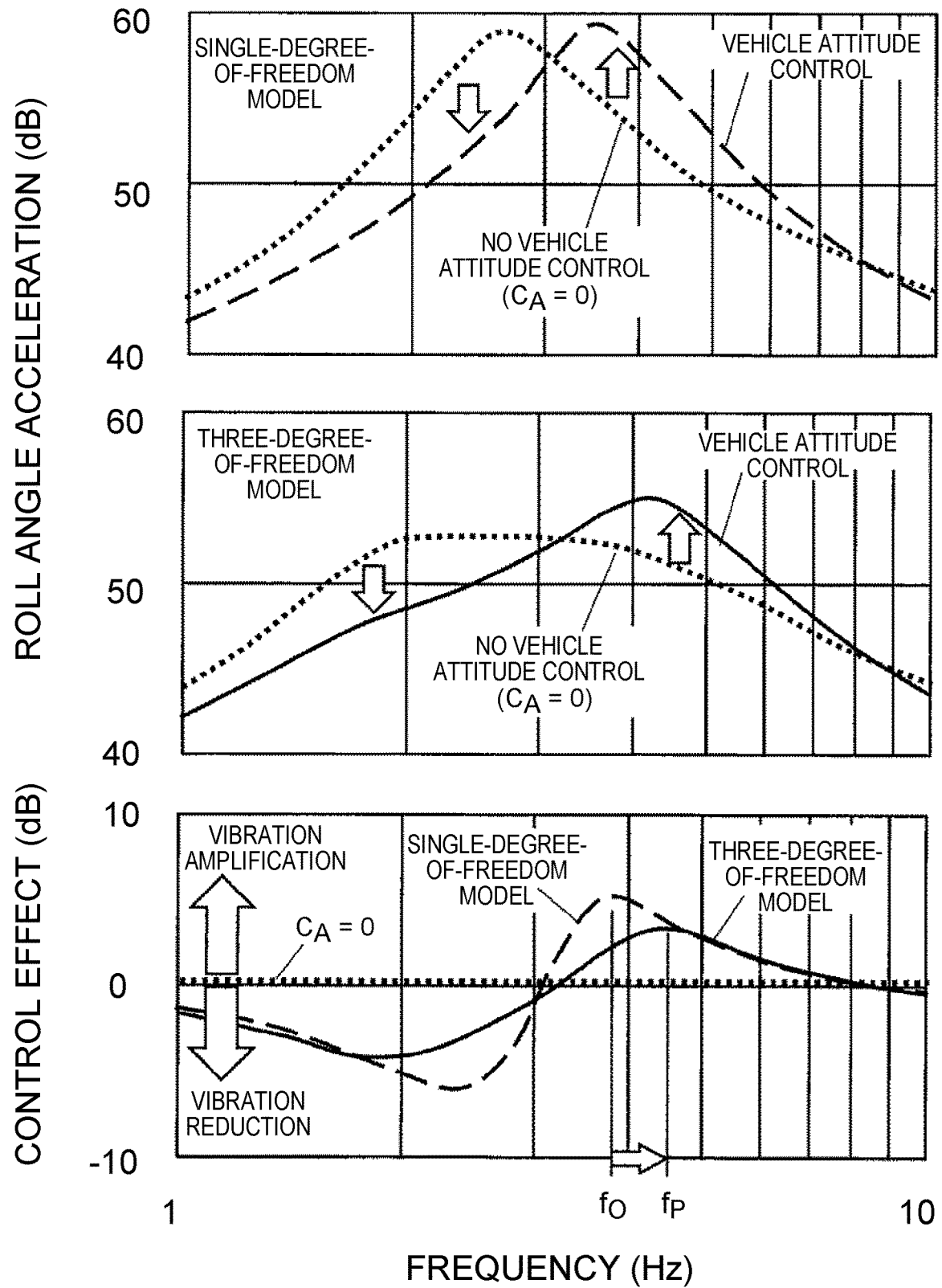
FIG. 7 is a diagram for comparing the result of the calculation using the single-degree-of-freedom model shown in FIG. 4 and the result of the calculation using the three-degree-of-freedom model shown in FIG. 6A and FIG. 6B.

FIG. 7 is a diagram for comparing the result of the calculation using the single-degree-of-freedom model shown in FIG. 4 and the result of the calculation using the three-degree-of-freedom model shown in FIG. 6A and FIG. 6B. Specifically, the upper graph in FIG. 7 illustrates a relation between the frequency and the roll angle acceleration that is obtained by the calculation of Equation (1), together with a relation when the vehicle attitude control is not performed (when $C_A$ is zero). The middle graph in FIG. 7 illustrates a relation between the frequency and the roll angle acceleration that is obtained by the calculation of Equations (2) to (4), together with a relation when the vehicle attitude control is not performed (when $C_A$ is zero). In each graph, the calculation is performed under the condition of a vehicle speed of 100 kph and $\phi_1 = \phi_2$. When the vehicle attitude control is performed, $C_A$=5000 Nms/rad, $\tau_A$=0.02 s, and $f_B$=4 Hz are adopted.

The lower graph in FIG. 7 illustrates a relation between the frequency and the control effect when the single-degree-of-freedom model shown in FIG. 4 is used and a relation between the frequency and the control effect when the three-degree-of-freedom model shown in FIG. 6A and FIG. 6B is used. As shown in the graph, there is a gap between a peak frequency $f_O$ in the single-degree-of-freedom model and a peak frequency $f_P$ in the three-degree-of-freedom model. In the control design of the vehicle attitude control according to the embodiment, the design of the cutoff frequency $f_B$ and the phase delay compensation time constant $\tau_A$ are performed based on the relation of the peak frequency $f_P$, the cutoff frequency $f_B$ and the phase delay compensation time constant $\tau_A$ in the three-degree-of-freedom model, which has a higher simulation accuracy.

Control Design in Which Wheelbase Filtering Is Considered

As described in the above analysis, by the vehicle attitude control, the suppression of the roll vibration is achieved in a certain frequency range, but the roll vibration is amplified in another frequency range. In the embodiment, a vehicle behavior called wheelbase filtering is used for suppressing the amplification of the roll vibration by the vehicle attitude control.

Figure 8:
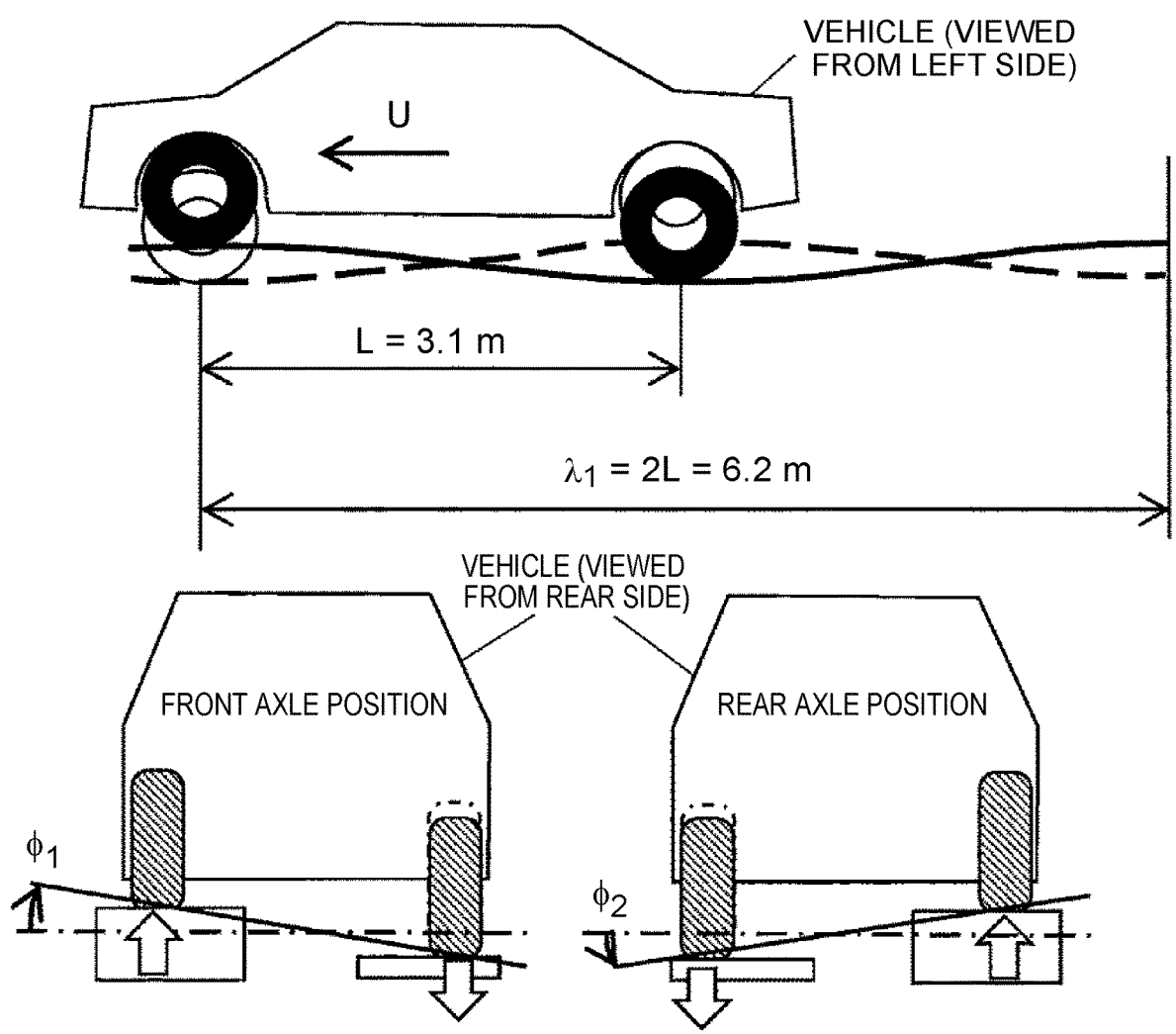
FIG. 8 is a diagram showing a model of wheelbase filtering.

FIG. 8 is a diagram showing a model of the wheelbase filtering. The upper diagram in FIG. 8 shows a left side view of the vehicle that travels at a vehicle speed U, and the lower diagram in FIG. 8 shows rear views at a front axle position and rear axle position of the vehicle. In this model, a road surface vertically undulates with a constant period, and the right wheel side undulation and left wheel side undulation of the road surface have opposite phases. For example, when a road surface wavelength $\lambda_1$ is twice of a wheelbase L as shown in FIG. 8, a front axle input and a rear axle input have a relation of canceling out each other, so that the roll vibration becomes extremely small. This is the vehicle behavior called the wheelbase filtering.

Specifically, between the road surface input roll angles $\phi_1$, $\phi_2$ at the front axle position and rear axle position, the following relational equation (6) holds.

[Equation 6]

$$\phi_2 = \phi_1 e^{-\frac{L}{U}s} \quad (6)$$

Using Equation (6), the following Equation (7) is obtained, by arranging the first member of the right side of the above motion equation (2) and evaluating a condition that minimizes the compelling force by the road surface input. At a frequency $f_N$ shown in Equation (7), the roll vibration is locally minimized. Hereinafter, the frequency $f_N$ shown in Equation (7) is referred to as a local minimum roll frequency in the wheelbase filtering. Here, N is an order (N=1, 2, 3, . . . ).

[Equation 7]

$$f_N = \frac{2N-1}{2\left(\frac{C_{\phi 1}}{K_{\phi 1}} - \frac{C_{\phi 2}}{K_{\phi 2}} + \frac{L}{U}\right)} \quad (7)$$

Figure 9:
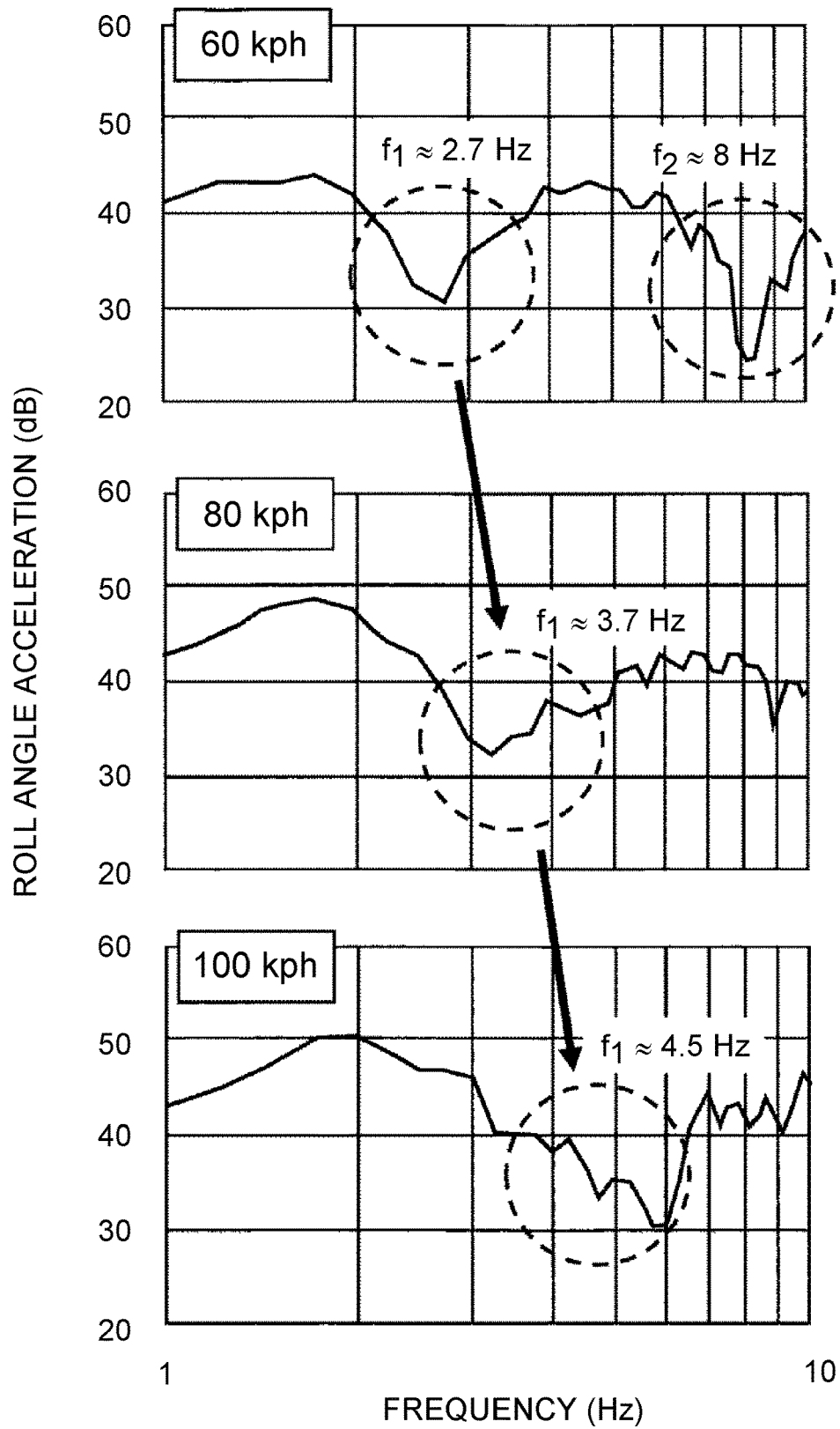
FIG. 9 is a diagram showing an example of measurement results in the wheelbase filtering.

FIG. 9 is a diagram showing an example of measurement results in the wheelbase filtering. In this example, in three cases of vehicle speeds of 60, 80 and 100 kph, the roll angle acceleration at the position of the center of gravity of the vehicle was measured for each frequency. The measurement results reveal that the frequency at a trough corresponding to the local minimum roll frequency $f_1$ changes depending on the change in the vehicle speed.

Figure 10:
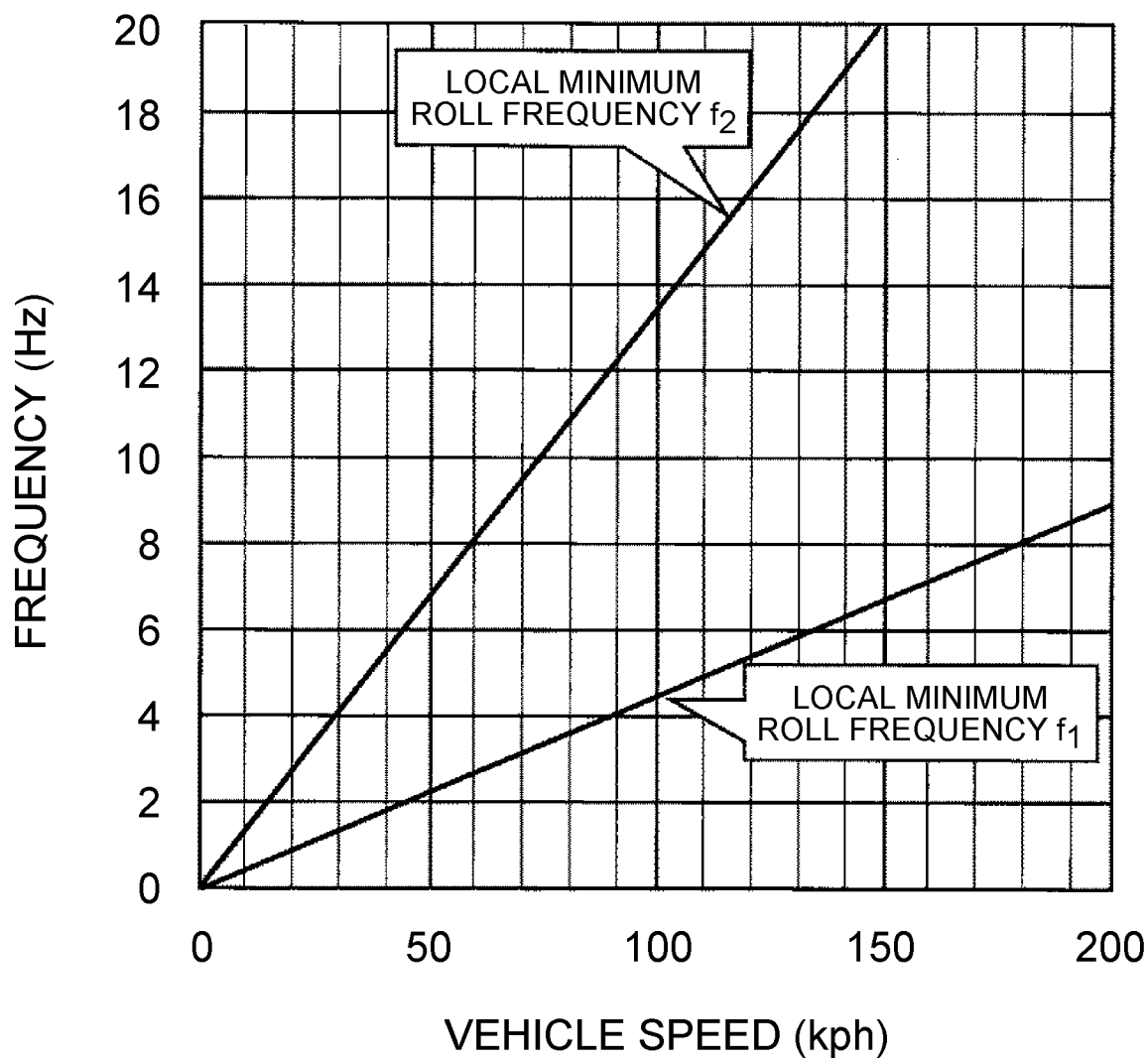
FIG. 10 is a diagram showing the relation between a local minimum roll frequency and a vehicle speed in the wheelbase filtering.

FIG. 10 is a diagram showing the relation between the local minimum roll frequency and the vehicle speed that is obtained by the calculation using Equation (7). As shown in the figure, the local minimum roll frequencies $f_1$, $f_2$ are proportional to the vehicle speed. The secondary local minimum roll frequency $f_2$ is greater than the primary local minimum roll frequency $f_1$ in the value with respect to an identical vehicle speed. The relation shown in FIG. 10 that is obtained by the calculation coincides with the measurement results shown in FIG. 9.

As can be seen from Equation (7), the local minimum roll frequency $f_N$ in the wheelbase filtering is determined by the specification of the vehicle and the vehicle speed. Meanwhile, the peak frequency $f_P$ in the roll vibration can be changed by the design of the cutoff frequency $f_B$ and the phase delay compensation time constant $\tau_A$. Therefore, in the case of using the wheelbase filtering for the suppression of the roll vibration, it is preferable to design the cutoff frequency $f_B$ and the phase delay compensation time constant $\tau_A$ such that the peak frequency $f_P$ at which the roll vibration is maximized coincides with the local minimum roll frequency $f_N$.

Figure 11:
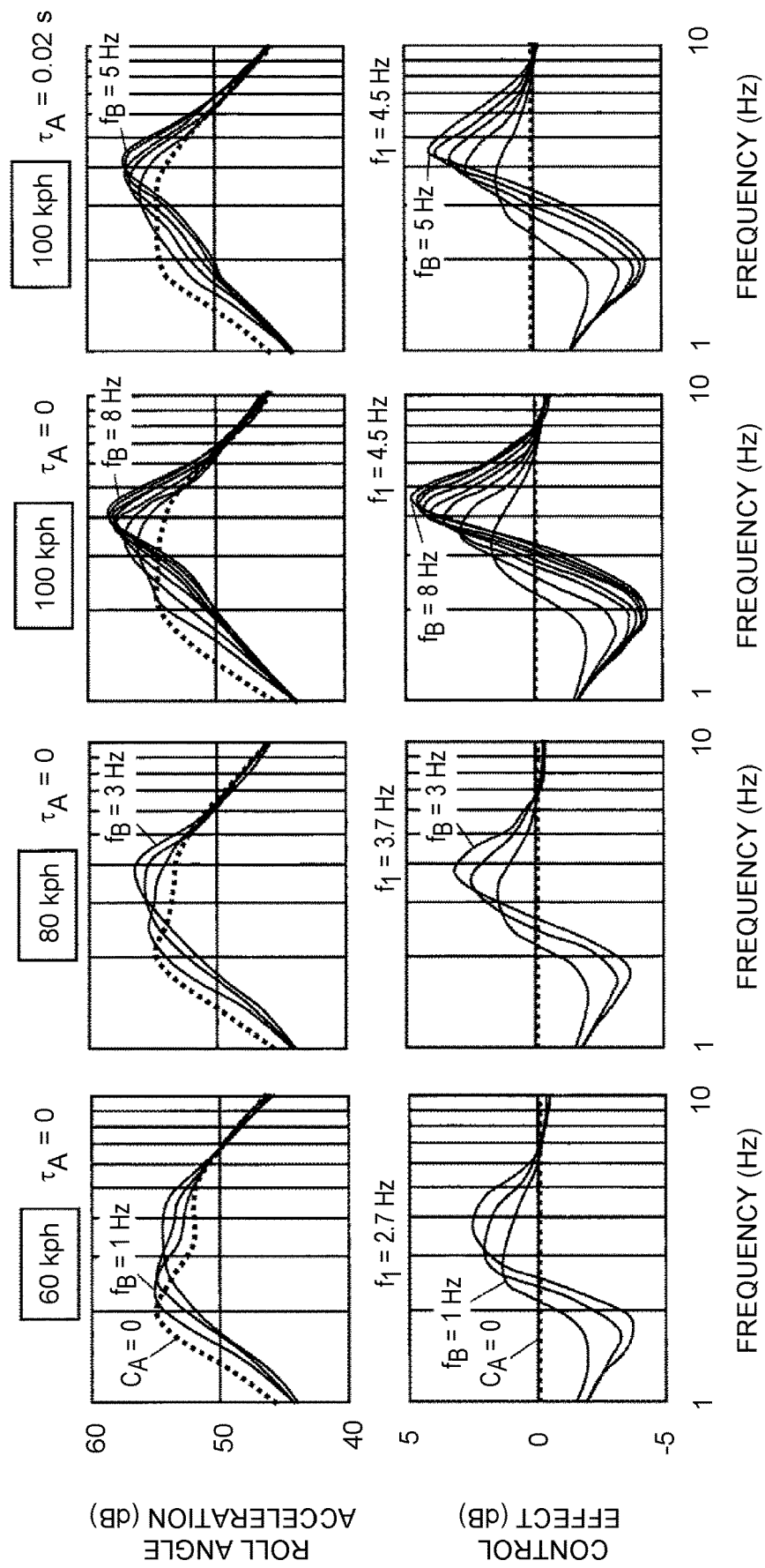
FIG. 11 is a diagram showing adjustment results of the peak frequency by the design of the cutoff frequency and a phase delay compensation time constant.

FIG. 11 is a diagram showing an example of adjustment results of the peak frequency by the design of the cutoff frequency $f_B$ and the phase delay compensation time constant $\tau_A$. In this example, adjustments were performed such that the local minimum roll frequency $f_1$ in the case of a vehicle speed of 60 kph was 2.7 Hz, the local minimum roll frequency $f_1$ in the case of a vehicle speed of 80 kph was 3.7 Hz and the local minimum roll frequency $f_1$ in the case of a vehicle speed of 100 kph was 4.5 Hz. The upper graphs in FIG. 11 illustrate the numerical calculation result of the roll angle acceleration when the road surface inputs to the front and rear axles satisfy $\phi_1=\phi_2$, for each vehicle speed and each cutoff frequency. The lower graphs in FIG. 11 illustrate the control effect for each vehicle speed and each cutoff frequency. The peak frequency at which the vibration amplification has a peak becomes higher as the cutoff frequency becomes higher.

Figure 12:
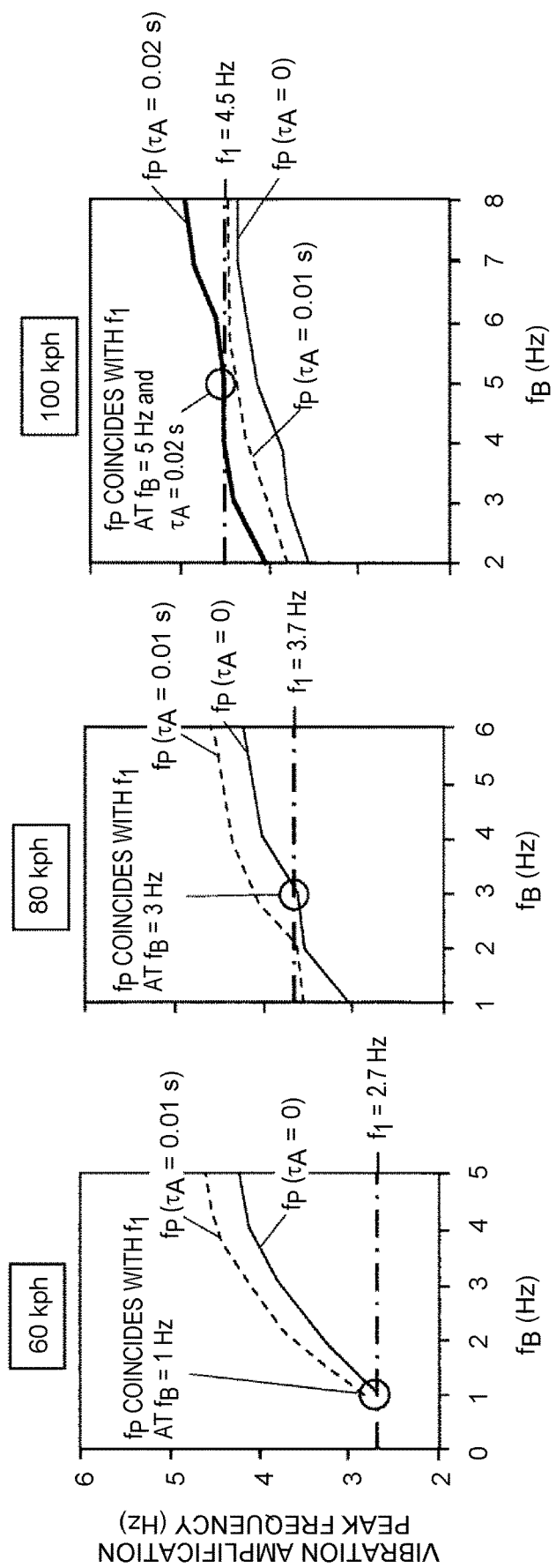
FIG. 12 is a diagram showing an influence of the phase delay compensation time constant on the relation between the cutoff frequency and the peak frequency.

FIG. 12 is a diagram showing an influence of the phase delay compensation time constant on the relation between the cutoff frequency and peak frequency that is obtained in the process of obtaining the adjustment results shown in FIG. 11. The graphs in FIG. 12 illustrate changes in the relation between the cutoff frequency $f_B$ and the peak frequency $f_P$ depending on the value of the phase delay compensation time constant $\tau_A$, in three cases of vehicle speeds of 60, 80 and 100 kph.

As shown in the lower graph on the first column in FIG. 11 and the graph on the first column in FIG. 12, when the vehicle speed is 60 kph, the peak frequency $f_P$ coincides with the local minimum roll frequency $f_1$ ($f_1$=2.7 Hz), at $\tau_A$=0 and $f_B$=1 Hz. In the example, at $\tau_A$=0.01 s, the peak frequency $f_P$ does not coincide with the local minimum roll frequency $f_1$, even when the cutoff frequency $f_B$ is decreased to 1 Hz, which is a lower limit determined from the specification of the controller 40.

As shown in in the lower graph on the second column in FIG. 11 and the graph on the second column in FIG. 12, when the vehicle speed is 80 kph, the peak frequency $f_P$ coincides with the local minimum roll frequency $f_1$ ($f_1$=3.7 Hz), at $\tau_A$=0 and $f_B$=3 Hz. In the example, at $\tau_A$=0.01 s, the peak frequency $f_P$ coincides with the local minimum roll frequency $f_1$, by a further decrease in the cutoff frequency $f_B$. However, since the active stabilizers 10, 20 can respond to a high-frequency roll vibration, the active stabilizers 10, 20 cannot exert the reduction effect for the roll vibration when the cutoff frequency is excessively decreased. Therefore, in the example, it is preferable to be $\tau_A$=0.

As shown in the lower graph on the third column in FIG. 11 and the graph on the third column in FIG. 12, when the vehicle speed is 100 kph, the peak frequency $f_P$ does not coincide with the local minimum roll frequency $f_1$ at $\tau_A=0$, even when the cutoff frequency $f_B$ is increased to 8 Hz, which is a upper limit determined from the specification of the controller 40. The same goes for the case of $\tau_A=0.01$ s. As shown in the lower graph on the fourth column in FIG. 11 and the graph on the third column in FIG. 12, the peak frequency $f_P$ coincides with the local minimum roll frequency $f_1$ ($f_1=4.5$ Hz), at $\tau_A=0.02$ s and $f_B=5$ Hz.

Figure 13:
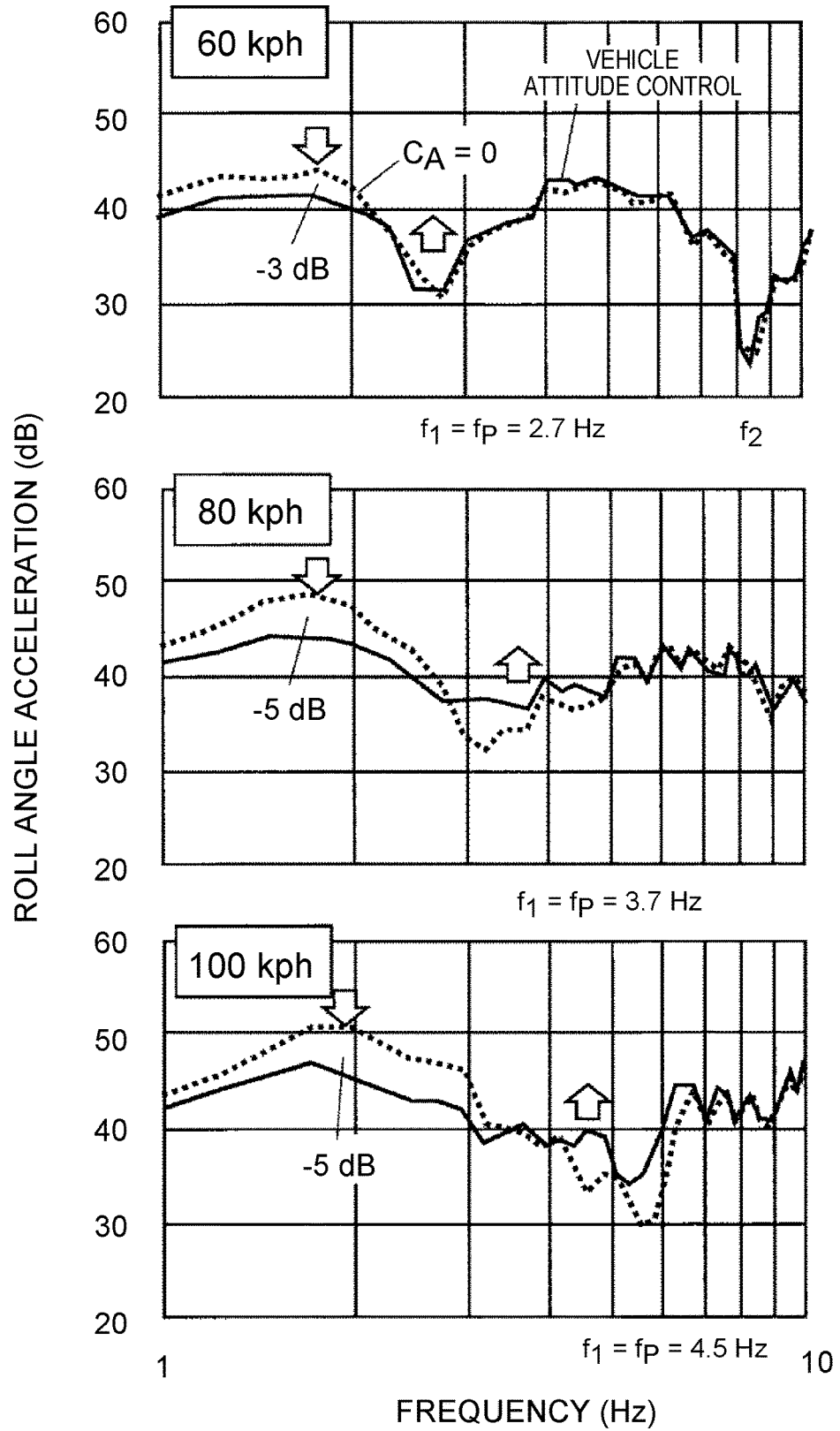
FIG. 13 is a diagram for comparing a case where the vehicle attitude control in the embodiment is performed and a case where the vehicle attitude control in the embodiment is not performed.

FIG. 13 shows experimental results for comparing a case where the vehicle attitude control was performed using the cutoff frequency $f_B$ and phase delay compensation time constant $\tau_A$ designed as described above and a case where the vehicle attitude control was not performed (when $C_A$ was zero). The experiment was performed in three cases of vehicle speeds of 60, 80 and 100 kph. At each vehicle speed, by the vehicle attitude control, in a range of 1 to 3 Hz near the roll resonant frequency of the vehicle 2, the roll vibration was reduced by up to 5 dB. On the other hand, in frequency ranges in which the vibration is amplified by the vehicle attitude control, it was confirmed that the roll vibration could be suppressed by the coincidence of the peak frequency $f_P$ in the roll vibration with the local minimum roll frequency $f_1$ in the wheelbase filtering.

Figure 14:
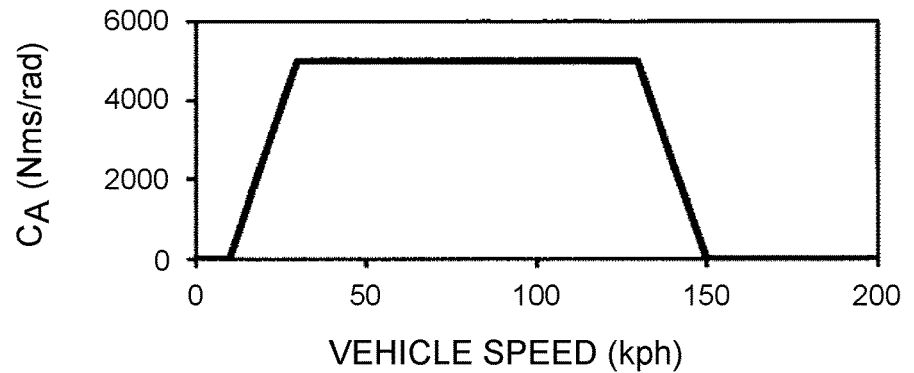
FIG. 14 is a diagram showing an exemplary design of the cutoff frequency and phase delay compensation time constant of a low-pass filter.
Figure 14:
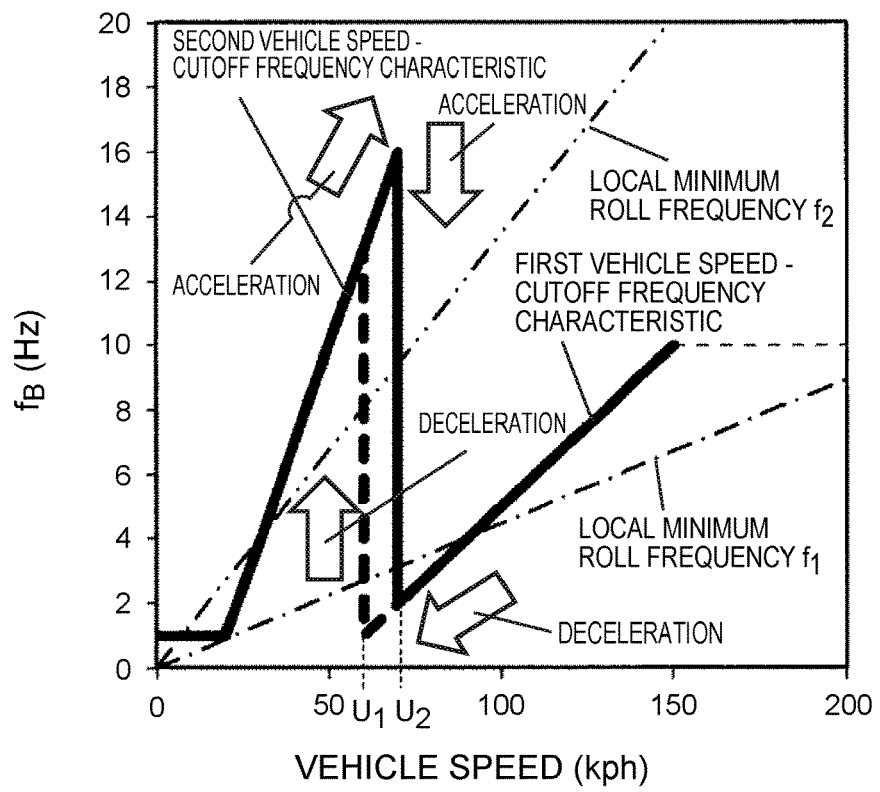
Figure 14:
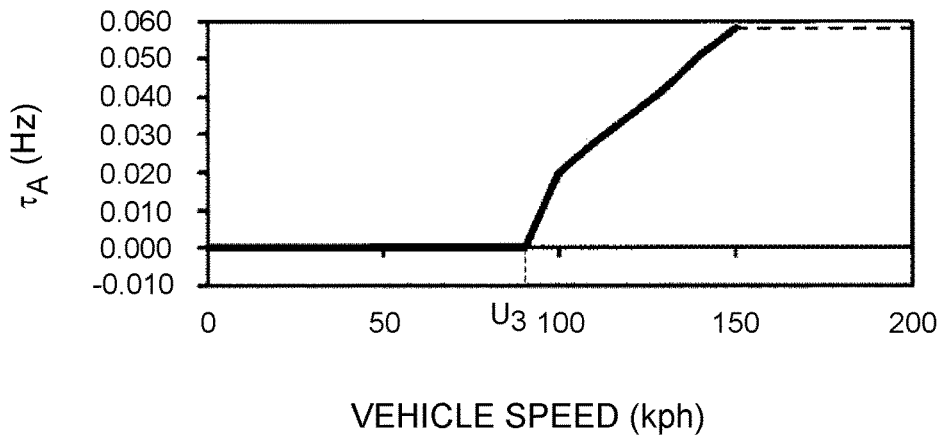

Exemplary Design of Cutoff Frequency $f_B$ and Phase Delay Compensation Time Constant $\tau_A$ of Low-Pass Filter FIG. 14 is a diagram showing an exemplary design of the cutoff frequency $f_B$ of the low-pass filter and the phase delay compensation time constant $\tau_A$, and the exemplary design supports a wider vehicle speed range. The upper graph in FIG. 14 shows an example of the setting of the roll skyhook damping coefficient $C_A$ with respect to the vehicle speed. The middle graph in FIG. 14 shows an example of the setting of the cutoff frequency $f_B$ with respect to the vehicle speed. The lower graph in FIG. 14 shows an example of the setting of the phase delay compensation time constant $\tau_A$ with respect to the vehicle speed.

In the exemplary design, as shown in the upper graph in FIG. 14, the roll skyhook damping coefficient $C_A$ is adjusted to zero in an extremely low vehicle speed range and a high vehicle speed range exceeding 150 kph. That is, the vehicle attitude control is performed in a vehicle speed range except the extremely low vehicle speed range and the high vehicle speed range. In the vehicle speed range in which the vehicle attitude control is performed, the value of the roll skyhook damping coefficient $C_A$ is constant regardless of the vehicle speed. Here, for preventing the vehicle attitude from being disordered by a sudden end or start of the vehicle attitude control, the roll skyhook damping coefficient $C_A$ is gradually decreased from the constant value to zero, when the vehicle speed decreases to the extremely low vehicle speed range. Similarly, when the vehicle speed increases to the high vehicle speed range, the roll skyhook damping coefficient $C_A$ is gradually decreased from the constant value to zero.

In the exemplary design, as shown in the middle graph in FIG. 14, two vehicle speed-cutoff frequency characteristics are set. The first vehicle speed-cutoff frequency characteristic is designed such that the peak frequency $f_P$ in the roll vibration coincides with the primary local minimum roll frequency $f_1$ in the wheelbase filtering. The second vehicle speed-cutoff frequency characteristic is designed such that the peak frequency $f_P$ in the roll vibration coincides with the secondary local minimum roll frequency $f_2$ in the wheelbase filtering. The relation between the vehicle speed and the local minimum roll frequencies $f_1$, $f_2$ changes depending on the wheelbase of the vehicle and grounding point lateral force characteristic.

At the time of deceleration, until the vehicle speed decreases to a first threshold speed $U_1$, the first vehicle speed-cutoff frequency characteristic is used as the characteristic of the low-pass filter 42. Then, when the vehicle speed becomes lower than the first threshold speed $U_1$, the characteristic of the low-pass filter 42 is switched from the first vehicle speed-cutoff frequency characteristic to the second vehicle speed-cutoff frequency characteristic. The reason for the switching is that the cutoff frequency $f_B$ becomes excessively low at a low vehicle speed in the first vehicle speed-cutoff frequency characteristic so that the active stabilizers 10, 20 cannot exert the reduction effect for the roll vibration.

On the other hand, at the time of acceleration, until the vehicle speed increases to a second threshold speed $U_2$, the second vehicle speed-cutoff frequency characteristic is used as the characteristic of the low-pass filter 42. Then, when the vehicle speed becomes higher than the second threshold speed $U_2$, the characteristic of the low-pass filter 42 is switched from the second vehicle speed-cutoff frequency characteristic to the first vehicle speed-cutoff frequency characteristic. The reason for the switching is that the cutoff frequency $f_B$ becomes excessively high at a high speed in the second vehicle speed-cutoff frequency characteristic. The second threshold speed $U_2$ is set to a higher speed than the first threshold speed $U_1$. By providing a hysteresis with a gap between the first threshold speed $U_1$ and the second threshold speed $U_2$, it is possible to prevent chattering from occurring in the switching of the vehicle speed-cutoff frequency characteristic.

In the exemplary design, as shown in the lower graph in FIG. 14, when the vehicle speed is equal to or lower than a third threshold speed $U_3$, the phase delay compensation time constant $\tau_A$ is set to zero, and when the vehicle speed is higher than the third threshold speed $U_3$, the phase delay compensation time constant $\tau_A$ is increased with the increase in the vehicle speed. The third threshold speed $U_3$ is set to a higher speed than the second threshold speed $U_2$. By adopting the phase delay compensation time constant $\tau_A$ as a parameter that is set depending on the vehicle speed in addition to the cutoff frequency $f_B$, it is possible to increase the coincidence degree between the local minimum roll frequencies $f_1$, $f_2$ and the peak frequency $f_P$ in the roll vibration, and to further suppress the roll vibration of the vehicle.

Other Embodiments

The stabilizer actuator of the active stabilizer may be a hydraulic stabilizer actuator. Here, the active stabilizer is an example of the actuator that is able to actively act on the roll of the vehicle. The disclosure can be also applied to a vehicle attitude control device that suppresses the roll vibration with an active suspension.

What is claimed is:

1. A vehicle attitude control device comprising:
an actuator configured to actively act on roll of a vehicle;
a roll angle acceleration sensor configured to measure a roll angle acceleration of the vehicle;
a speed sensor configured to measure a vehicle speed of the vehicle; and
a controller including a low-pass filter, the controller being configured to calculate a manipulated variable of the actuator based on the roll angle acceleration and the vehicle speed, the manipulated variable being a manipulated variable that allows the roll of the vehicle to be suppressed, wherein the controller is configured
- to process the roll angle acceleration with the low-pass filter,
- to integrate the roll angle acceleration in which a high-frequency component has been removed by the low-pass filter, and
- to convert a roll angle velocity obtained by the integration, into the manipulated variable, the low-pass filter has a first vehicle speed-cutoff frequency characteristic in which a cutoff frequency becomes higher with increase in the vehicle speed, and the first vehicle speed-cutoff frequency characteristic is designed such that a peak frequency in roll vibration coincides with a local minimum roll frequency in wheelbase filtering, the roll vibration being amplified by a dead time and a phase delay in control by the controller.

2. The vehicle attitude control device according to claim 1, wherein the first vehicle speed-cutoff frequency characteristic is designed such that the peak frequency coincides with a primary local minimum roll frequency in the wheelbase filtering.

3. The vehicle attitude control device according to claim 2, wherein the low-pass filter has a second vehicle speed-cutoff frequency characteristic, the second vehicle speed-cutoff frequency characteristic being designed such that the second vehicle speed-cutoff frequency characteristic is higher than the first vehicle speed-cutoff frequency characteristic in a cutoff frequency with respect to an identical vehicle speed and the peak frequency coincides with a secondary local minimum roll frequency in the wheelbase filtering, and the controller is configured to switch a characteristic of the low-pass filter from the first vehicle speed-cutoff frequency characteristic to the second vehicle speed-cutoff frequency characteristic, when the vehicle speed becomes lower than a first threshold speed.

4. The vehicle attitude control device according to claim 3, wherein the controller is configured to switch the characteristic of the low-pass filter from the second vehicle speed-cutoff frequency characteristic to the first vehicle speed-cutoff frequency characteristic, when the vehicle speed becomes higher than a second threshold speed that is higher than the first threshold speed.

5. The vehicle attitude control device according to claim 1, wherein the controller is configured to calculate a correction value, by multiplying the roll angle acceleration in which the high-frequency component has been removed by the low-pass filter, by a phase delay compensation time constant, and to add the correction value to the roll angle velocity to be converted into the manipulated variable, and a value of the phase delay compensation time constant is changed depending on the vehicle speed.

6. The vehicle attitude control device according to claim 5, wherein the controller is configured to set the phase delay compensation time constant to zero, when the vehicle speed is equal to or lower than a third threshold speed, and to increase the phase delay compensation time constant with the increase in the vehicle speed, when the vehicle speed is higher than the third threshold speed.

* * * * *